United States Patent
Nordholm et al.

(10) Patent No.: US 12,388,128 B2
(45) Date of Patent: Aug. 12, 2025

(54) METHOD OF DETERMINING A PRECONDITIONING STATUS OF A VEHICLE COMPONENT OR SYSTEM

(71) Applicant: VOLVO TRUCK CORPORATION, Gothenburg (SE)

(72) Inventors: Linus Nordholm, Gothenburg (SE); Jerker Lennevi, Lerum (SE); Simon Brunet, Landvetter (SE); Robert Karlsson, Kållekärr (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 155 days.

(21) Appl. No.: 17/664,328

(22) Filed: May 20, 2022

(65) Prior Publication Data
US 2022/0384871 A1    Dec. 1, 2022

(30) Foreign Application Priority Data
May 25, 2021    (EP) .................................... 21175765

(51) Int. Cl.
| | |
|---|---|
| *H01M 10/633* | (2014.01) |
| *B60L 58/24* | (2019.01) |
| *B60L 58/32* | (2019.01) |
| *G07C 5/00* | (2006.01) |
| *H01M 8/04701* | (2016.01) |
| *H01M 10/625* | (2014.01) |

(52) U.S. Cl.
CPC .......... *H01M 10/633* (2015.04); *B60L 58/24* (2019.02); *B60L 58/32* (2019.02); *G07C 5/006* (2013.01); *H01M 8/04701* (2013.01); *H01M 10/625* (2015.04); *B60L 2240/545* (2013.01); *H01M 2220/20* (2013.01); *H01M 2250/20* (2013.01)

(58) Field of Classification Search
CPC ............. H01M 10/633; H01M 10/625; H01M 8/04701; H01M 2220/20; H01M 2250/20; B60L 58/24; B60L 58/32; B60L 2240/545; G07C 5/006
See application file for complete search history.

(56) References Cited

U.S. PATENT DOCUMENTS

| | | | |
|---|---|---|---|
| 2013/0288089 A1 | 10/2013 | Kinoshita et al. | |
| 2016/0079633 A1 | 3/2016 | Wahlstrom et al. | |
| 2018/0198173 A1* | 7/2018 | Ichikawa | ............ H01M 10/625 |

(Continued)

FOREIGN PATENT DOCUMENTS

| | | |
|---|---|---|
| EP | 2679418 A1 | 1/2014 |
| EP | 3154120 A1 | 4/2017 |

(Continued)

OTHER PUBLICATIONS

Extended European Search Report in corresponding European Application No. 21175765.3 dated Nov. 18, 2021 (14 pages).

*Primary Examiner* — James J Lee
*Assistant Examiner* — Steven Vu Nguyen
(74) *Attorney, Agent, or Firm* — Venable LLP; Jeffri A. Kaminski

(57) ABSTRACT

A method of determining a preconditioning status of a vehicle component or system.

The method includes receiving a preconditioning status request for a vehicle component or system;
determining the preconditioning status by a preconditioning model estimating the preconditioning status without activating the corresponding vehicle component or system.

13 Claims, 3 Drawing Sheets

(56) References Cited

U.S. PATENT DOCUMENTS

| | | | | |
|---|---|---|---|---|
| 2018/0334170 A1* | 11/2018 | Liu | ...................... | B60W 10/30 |
| 2019/0217721 A1* | 7/2019 | Marcicki | .............. | H01M 10/613 |
| 2019/0359083 A1 | 11/2019 | Hettrich et al. | | |
| 2021/0070180 A1 | 3/2021 | Del Core | | |
| 2021/0270907 A1* | 9/2021 | Shimonishi | ....... | H01M 10/4285 |
| 2022/0158274 A1* | 5/2022 | Peron | .................. | H01M 50/209 |

FOREIGN PATENT DOCUMENTS

| | | |
|---|---|---|
| EP | 3582030 A1 | 12/2019 |
| WO | 2019099033 A1 | 5/2019 |

* cited by examiner

METHOD OF DETERMINING A PRECONDITIONING STATUS OF A VEHICLE COMPONENT OR SYSTEM

TECHNICAL FIELD

The present invention relates to a method of determining a preconditioning status of a vehicle component or system. The invention further relates to a control unit for determining a preconditioning status of a vehicle component or system, and to a vehicle.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage or energy transformation device, such as e.g. a battery or a fuel cell, is used to provide the energy needed in order to propel the vehicle. The energy storage or energy transformation devices may typically be comprised in an energy storage system or a fuel cell system of the vehicle.

During, or prior to, operation of the vehicle, there may be a need to precondition a vehicle component or system of the vehicle, such as e.g. the energy storage system or fuel cell system. In order to determine if such preconditioning is needed, the user of the vehicle, or a system of the vehicle, may require information regarding the need for preconditioning. Such preconditioning information is typically retrieved by requesting a preconditioning status of the particular vehicle component or system. Alternatively, the preconditioning of the vehicle component or system is performed periodically, in order to have the vehicle component or system ready for operation. Such periodically performed preconditioning may to at least some extent imply unnecessary preconditioning, as the preconditioning is performed prior to actually being needed, and/or result in a vehicle component or system not being preconditioned properly as the preconditioning is performed later than needed.

Both the preconditioning, and the request for preconditioning status, requires energy, typically from the energy storage system or a fuel cell system of the vehicle. As the available energy or power is either limited, e.g. when the vehicle is not subject to charging or fueling, and/or is associated with a cost or an environmental impact, reducing the energy consumption of the vehicle is a common desire.

SUMMARY

It is an object of the present invention to at least to some extent alleviate the shortcomings discussed above in relation to preconditioning, and the request for preconditioning status, of a vehicle component or system.

According to at least a first aspect of the present invention, a method of determining a preconditioning status of a vehicle component or system is provided. The method comprises:
  receiving a preconditioning status request for a vehicle component or system;
  determining the preconditioning status by a preconditioning model estimating the preconditioning status without activating the corresponding vehicle component or system.

Hereby, unnecessary activations of the vehicle component or system being subject to the preconditioning status request can be reduced or even avoided. Thus, energy may be saved. Additionally, any wear, electrical and/or mechanical wear, related to the activation of the vehicle component or system being subject to the preconditioning status request can be reduced or even avoided. Moreover, as the determination of the preconditioning status by a preconditioning model is used in response to receiving a preconditioning status request for the particular vehicle component or system, the preconditioning modelling of estimating the preconditioning status of the vehicle component or system is only used when needed or requested, providing an efficient energy usage in relation to the preconditioning modelling. Moreover, periodically performed preconditioning avoided as the preconditioning may be performed based on the preconditioning status by the preconditioning model.

According to at least one example embodiment, the vehicle component or system being subject to the preconditioning status request is a vehicle component or system which may be brought into a hibernation, or stand-by, mode. Such mode may additionally be referred to as a sleeping mode or energy-saving mode. In such hibernation mode, the system or component is consuming no, or very little, energy or power.

According to at least one example embodiment, the receiving of a preconditioning status request for a vehicle component or system is performed for a vehicle component or system in hibernation mode. Thus, by not activating the vehicle component or system during the determination of the preconditioning status by the preconditioning model, the vehicle component or system is not woken up, or is not brought into an activated mode. Thus, the vehicle component or system is kept in the hibernation mode, as the preconditioning status is estimated by the preconditioning model. Thus, the term "without activating" may be referred to as "without waking up" or "without starting" or "without triggering" the vehicle component or system.

According to at least one example embodiment, the preconditioning model is based on a mathematical model of the vehicle component or system, the mathematical model representing the behaviour of the vehicle component or system, e.g. based on empirical data. The preconditioning model is typically based on input data, such as e.g. parameters of the environment to the vehicle component or system, and output data, wherein at least the output data comprises an output parameter representing the sought preconditioning status. Thus, the preconditioning status by the preconditioning model may be a mathematical based determination or estimation. The method of the invention may thus be referred to as a method of estimating the preconditioning status of a vehicle component or system. The preconditioning model is typically time-dependent.

According to at least one example embodiment, the method comprises:
  maintaining a database with the preconditioning model corresponding to the vehicle component or system.

According to at least one example embodiment, the method comprises:
  in response to the preconditioning status of the vehicle component or system, preconditioning the vehicle component or system.

Thus, depending on the preconditioning status, e.g. based on the estimated preconditioning status by the preconditioning model, the vehicle component or system may be preconditioned, and thus prepared for operation of the vehicle. According to at least one example embodiment, the preconditioning status is used as information to not preconditioning the vehicle component or system, as such preconditioning is deemed not needed at the particular point in time.

According to at least one example embodiment, the preconditioning status is a temperature status, and the preconditioning status request comprises a request for the temperature of the vehicle component or system.

Hereby, the preconditioning model represents a thermal model, or heat transfer model, of the vehicle component or system, and the temperature of the vehicle system or model can be determined or estimated based on the preconditioning model. Thus, the receiving of a preconditioning status request for a vehicle component or system comprises receiving a temperature status request for the vehicle component or system, and the determining the preconditioning status by a preconditioning model estimating the preconditioning status comprises determining the temperature status by the preconditioning model estimating the current temperature of the vehicle component or system.

According to at least one example embodiment, the method comprises
  providing a preconditioning model, wherein the preconditioning model utilizes known temperature characteristics of the vehicle component or system to estimate the current temperature of the vehicle component or system.

Hereby, a simple yet effective means of determining the current temperature of the vehicle component or system is provided. For example, the known temperature characteristics comprises internal heat transfer distribution within the vehicle component or system and/or heat transfers relationships with the surroundings of the vehicle component or system. Typically, the known temperature characteristics of the vehicle component or system is a function of time. Thus, the current temperature of the vehicle component or system at a certain point in time may be estimated by the preconditioning model. For example, the certain point in time is the point in time subsequent to a shut-down, or disconnection, of the corresponding vehicle component or system. Such shut-down or disconnection may e.g. be corresponding to bringing the vehicle component or system in the hibernation mode as previously described. Stated differently, the known temperature characteristics may be used as a basis in the modelled temperature profile, the latter typically being a function of time after the shut-down or disconnection of the corresponding vehicle component or system. Preferably, the known temperature characteristics is moreover based on the known temperature of the vehicle component or system at the time of shut-down or disconnection of the vehicle component or system.

According to at least one example embodiment, the preconditioning model utilizes the ambient temperature of the vehicle to estimate the current temperature of the vehicle component or system.

Thus, heat transfer of the vehicle component or system with the surroundings may be carried out in a straightforward manner. For example, the known temperature characteristics may be based on a known temperature profile as a function of ambient temperature and time after the shut-down or disconnection of the corresponding vehicle component or system.

According to at least one example embodiment, the method further comprises:
  measuring the ambient temperature of the vehicle, and providing the ambient temperature as an input data to the preconditioning model.

Hereby, a simple yet effective means of implementing the ambient temperature to the preconditioning model is provided.

According to at least one example embodiment, the method comprises:
  comparing the estimated preconditioning status with a reference value, and in response of determining that the estimated preconditioning status differs from the reference value by a set threshold, retrieving the actual preconditioning status of the vehicle component or system by activating the vehicle component or system, respectively.

Thus the preconditioning status is determined by the actual preconditioning status. That is, the actual preconditioning status is used as the estimated preconditioning status is outside of the set threshold. The set threshold may e.g. correspond to a scenario in which the estimated preconditioning status is deemed not to be trusted, i.e. a scenario in which it is assumed that the preconditioning model does not give a representing value of the preconditioning status. In other words, the previously determined preconditioning status by the estimated preconditioning status is overridden by the actual preconditioning status. Thus, the vehicle component or system is activated, and the preconditioning status may be retrieved from the vehicle component or system itself. Thus, the vehicle component or system is brought out of its hibernation mode.

According to at least one example embodiment, the method comprises:
  heating and/or cooling the vehicle component or system in response of determining that the preconditioning status is outside of a predetermined range.

For example, the preconditioning status is a preconditioning temperature, and the predetermined range is a temperature range. Hereby, in case the vehicle component or system is considered to be outside of a certain temperature range, the vehicle component or system may be heated or cooled depending on which brings the preconditioning temperature closer to the temperature range. In other words, the method comprises preconditioning the vehicle component or system by means of heating and/or cooling.

According to at least one example embodiment, the vehicle component or system is an energy storage system or fuel cell system of the vehicle.

The energy storage system is for example a rechargeable energy storage system such as e.g. a battery system. For example, the method comprises:
  receiving a preconditioning status request for the energy storage system or fuel cell system of the vehicle, such as e.g. a preconditioning status request for the battery system;
  determining the preconditioning status, such as the preconditioning temperature, by a preconditioning model estimating the preconditioning status without activating the corresponding the energy storage system or fuel cell system of the vehicle.

According to a second aspect of the present invention, a control unit for determining a preconditioning status of a vehicle component or system is provided. The control unit is configured to:
  receive a preconditioning status request for a vehicle component or system;
  determine the preconditioning status by using a preconditioning model to estimate the preconditioning status without activating the corresponding vehicle component or system.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to at least one example embodiment, the control unit is configured to carried out the method in accordance with the first aspect of the invention.

Thus, the method may be carried out using a control unit, e.g. a vehicle onboard control unit. Moreover, the preconditioning model may be stored in the control unit, and thus the step of determining the preconditioning status may be performed by means of the control unit and the preconditioning model.

According to at least one example embodiment, the control unit is configured to measure the ambient temperature of the vehicle, and to provide the ambient temperature as input data to the preconditioning model.

Hereby, a simple yet effective means of providing the ambient temperature is provided. For example, the control unit is coupled to a temperature sensor arranged and configured to measure the ambient temperature.

According to at least one example embodiment, the control unit is configured to compared the estimated preconditioning status with a reference value, and in response of determining that the estimated preconditioning status differs from the reference value by a set threshold, retrieve the actual preconditioning status of the vehicle component or system by activating the vehicle component or system, respectively.

Thus the preconditioning status is determined by the actual preconditioning status, as described with reference to the first aspect of the invention.

According to at least one example embodiment, the control unit is configured to activate heating and/or cooling of the vehicle component or system in response of determining that the preconditioning status is outside of a predetermined range.

For example, the control unit may be coupled to a heater or cooler arranged and configured to control the temperature of the vehicle component or system.

According to at least one example embodiment, the control unit is a control unit for an energy storage system or a fuel cell system of the vehicle.

For example, the energy storage system is a battery system, and the control unit is a control unit for the battery system.

According to a third aspect of the present invention, a vehicle comprising the control unit of the second aspect of the invention is provided.

According a fourth aspect of the present invention, a computer program is provided. The computer program comprises program code means for performing the method of the first aspect of the invention, when the program is run on a computer.

Such computer program may e.g. be implemented in a control unit, such as an ECU of the vehicle, e.g. the control unit according to the second aspect of the invention.

According to a fifth aspect of the present invention, a computer readable medium carrying a computer program comprising program code means for performing the method of the first aspect of the invention, when the program product is run on a computer, is provided.

Effects and features of the third to fifth aspects of the invention are largely analogous to those described above in connection with the first and second aspects of the invention. Embodiments mentioned in relation to the first and second aspects of the invention are largely compatible with the third to fifth aspects of the invention.

The order of the method steps described in the present disclosure is not constrained to that described in the first aspect of the invention. One or several of the steps could switch places, or occur in a different order without departing from the scope of the invention. However, according to at least one example embodiment, the method steps are performed in the consecutive order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
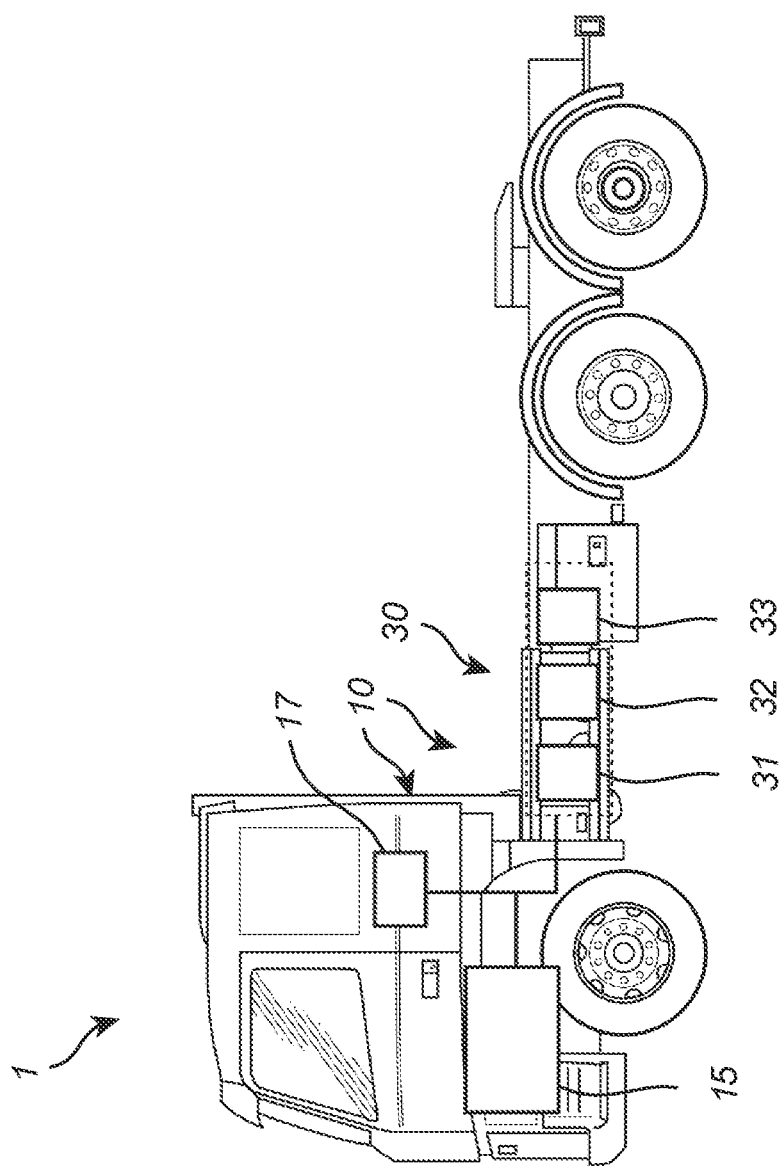
FIG. 1 is a schematic side view of a vehicle comprising a control unit and a vehicle component or system in the form of a battery system, in accordance with example embodiments of the invention.

With reference to FIG. 1, a vehicle 1, here embodied as a heavy duty truck 1, is disclosed for which a method, control unit 17 and a vehicle component or system 30 being subject to a request for preconditioning status of a kind disclosed in the present invention is advantageous. However, the method, control unit 17 or vehicle component or system 30 may as well be implemented in other types of vehicles, such as in busses, light-weight trucks, passenger cars, marine applications (e.g. in a vessel) etc. The vehicle 1 is an electric vehicle, such as a full electric vehicle or a hybrid, comprising at least one electric machine 15. In FIG. 1, the vehicle component or system 30 is an energy storage system or a fuel cell system 30, such as e.g. a battery system 30, which is configured to power the electric machine 15. In the example of FIG. 1, the energy storage system or a fuel cell system comprises three energy storage devices 31, 32, 33, e.g. being battery packs 31, 32, 33. The control unit 17 and the energy storage system or a fuel cell system may be referred to as a vehicle system 10 relative the electric machine 15. The control unit 17 is e.g. arranged and configured for controlling the operation of the energy storage system or a fuel cell system 30. The vehicle 1 typically further comprises other parts of the powertrain such as transmission, drive shafts and wheels (not shown in detail).

Figure 2:
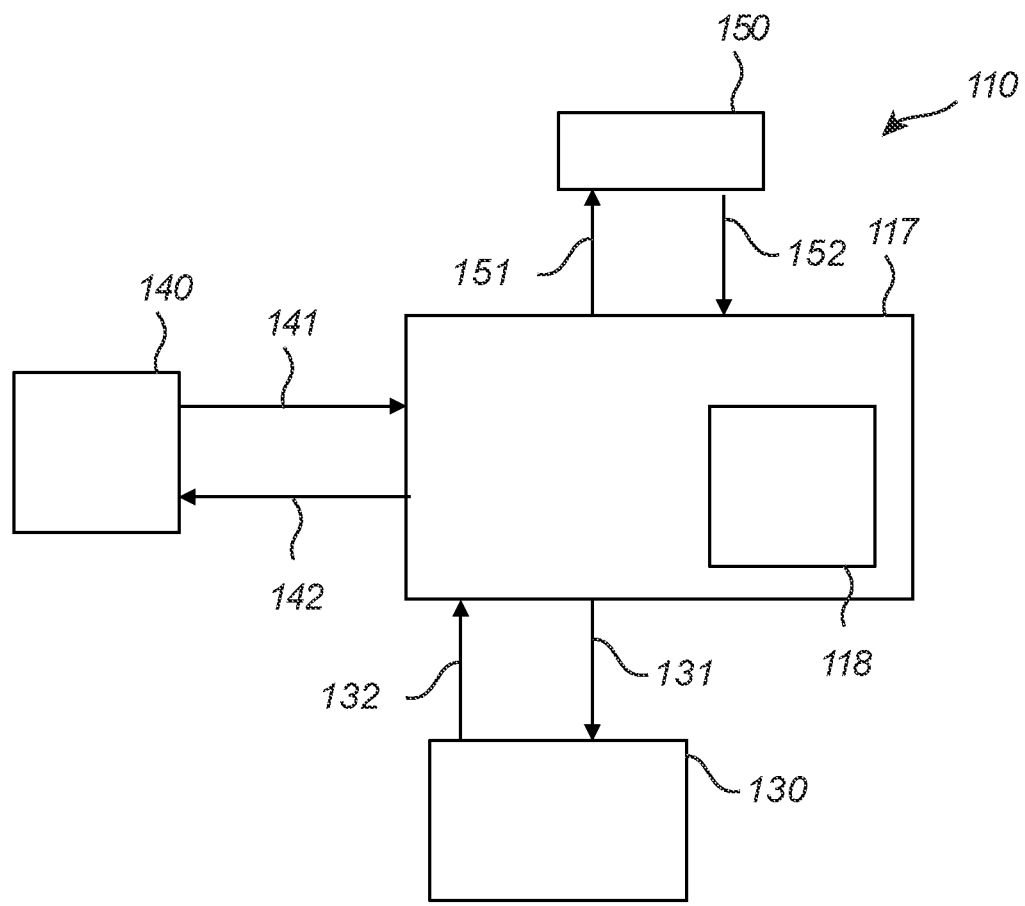
FIG. 2 is a schematic view of a vehicle system comprising at least a control unit and a vehicle component or system, in accordance with an example embodiment of the invention.

FIG. 2 is a schematic view of a system 110, or vehicle system 110, comprising a control unit 117 and various vehicle components and systems interacting with the control unit 117. The vehicle system 110 may also be referred to as a vehicle arrangement 110. The embodiment shown in FIG. 2 may be implemented in the vehicle 1 of FIG. 1. The vehicle system 110 further comprises a vehicle component or system 130 being subject to a preconditioning status request (i.e. a vehicle component or system 130 for which a preconditioning status request is conceivable) and a request unit 140 configure to request for a preconditioning status of the vehicle component or system 130. The vehicle component or system 130 may e.g. comprise vehicle components and/or vehicle systems or sub-system providing information related to the preconditioning status. For example, the vehicle component or system 130 is an energy storage system or a fuel cell system of the vehicle, such as e.g. a battery system (as shown in FIG. 1). The request unit 140 may e.g. be integrated into a vehicle functionality of automatically or periodically requesting preconditioning status of a vehicle component or system 130, and/or may be a user-input device configured to enable a manual functionality of requesting preconditioning status of a vehicle component or system 130. The latter may e.g. be a vehicle display or a user device, such as e.g. a mobile phone or tablet. In the embodiment of FIG. 2, a parameter providing unit 150 configured to provide parameter data, such as e.g. external parameter data, is also comprised in the vehicle system 110. The parameter providing unit 150 may e.g. be a sensor, such as a temperature sensor. The parameter providing unit 150 may be at least one sensor 150, or a plurality of sensors 150. Thus, the control unit 117 is configured to interact with the vehicle component or system 130, the request unit 140 and the parameter providing unit 150.

As shown in FIG. 2, the control unit 117 comprises a preconditioning model 118. That is, the control unit 117 typically comprises a computer program comprising program code means for at least executing the preconditioning model 118, and possibly storing the preconditioning model 118. It should be noted that the preconditioning model 118 need not to be comprised in the control unit 117, but it may be stored in a database external of the control unit 117. In such case, the control unit 117 is configured to interact with the external database and the preconditioning model therein. Moreover, the preconditioning model 118 may be at least one preconditioning model based on a particular vehicle component or system, and may comprises a plurality of preconditioning models or sub-models, each of the plurality of preconditioning models or sub-models corresponding to a particular vehicle component or system. Thus, in other words, for a vehicle component or subsystem for which a preconditioning status request is conceivable, there is a corresponding preconditioning model.

The control unit 117 is configured to determine the preconditioning status of the vehicle component or system 130. In more detail, the control unit 117 is configured to determine the preconditioning status by using the preconditioning model 118 to estimate the preconditioning status of the vehicle component or system 130 without activating the corresponding vehicle component or system 130. Thus, the determined preconditioning status may be the estimated preconditioning status given by the preconditioning model 118. This may e.g. be performed as described in the following section.

The control unit 117 receives a preconditioning status request 141 for a vehicle component or system from the request unit 140. For example, a user is requesting the preconditioning status for a particular vehicle component or system 130 by means of a user device. The control unit 117 is configured to associate the preconditioning status for the particular vehicle component or system 130 with a preconditioning model 118. In other words, a preconditioning model 118 corresponding to the particular vehicle component or system 130 is used by the control unit 117. Based on the characteristics of the preconditioning model 118, the control unit 117 may interact with the parameter providing unit 150 to provide input data to the preconditioning model 118. For example, the control unit 117 may request a specific parameter by a parameter request 151, and receive the requested parameter 152 by the parameter providing unit 150. Hereby, potentially needed input data to the preconditioning model 118 is provided. Subsequently, the control unit 117 determines the preconditioning status of the particular vehicle component or system 130 by using the corresponding preconditioning model 118 and estimating the preconditioning status, potentially with input data from the the parameter providing unit 150. Hereby, direct interaction with the vehicle component or system 130 being subject to the preconditioning status request can be avoided, and thus there is no activation of the corresponding vehicle component or system 130. Hereby, energy can be saved. Instead, the control unit 117 may send the estimated preconditioning status 142 from the preconditioning model 118 to the request unit 140, e.g. as presented data to the user.

According to at least one example embodiment, the vehicle component or system 130 being subject to the preconditioning status request is a battery system 130, and the parameter providing unit 150 is a temperature sensor 150 configured to measure the ambient temperature of the vehicle. Moreover, the preconditioning model 118 is a thermal model, or heat transfer model, of the battery system 130. Thus, the preconditioning model 118 utilizes known temperature characteristics of the battery system 130 to estimate the current temperature of the battery system 130. The ambient temperature measured by the temperature sensor 150 may be used as input data to the preconditioning model 118, facilitating the estimation of the current temperature of the battery system 130.

Figure 3:
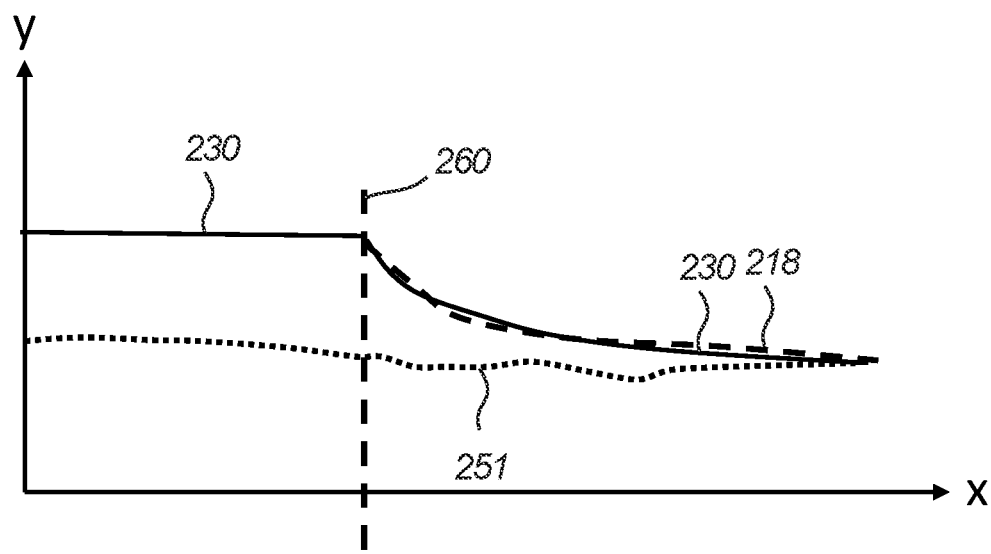
FIG. 3 is a graph showing the temperature as a function of time for the actual temperature of a vehicle component or system, and estimated output data of the preconditioning model as a corresponding temperature profile.

For example, the preconditioning model 118 may be used to determine or estimate the current temperature of the battery system at a certain point in time, typical a point in time subsequent to a shut-down of the battery system 130, or disconnection of the battery system 130 (i.e. when the battery system 130 is no longer powering a load of the vehicle). Such scenario is shown in FIG. 3, being a graph showing the temperature (y-axis) as a function of time (x-axis), in which the actual temperature of the battery system 130 is represented by the solid line 230. During operation of the battery system 130 (e.g. by powering an electric machine of the vehicle), the temperature 230 of the battery system 130 is constant (but way of course vary in line with the operation principle of the battery system 130). Then, upon a shut-down, or disconnection, of the battery system 130, represented by the vertical dashed line 260, the temperature of the battery system 130 is decreasing as heat is transferred to the surroundings of the battery system 130 in correspondence with heat transfer fundamentals. Such shut-down, or disconnection, 260 may e.g. be the result of a turning off of the electric machine due to a standstill of the vehicle. As also shown in FIG. 3, the ambient temperature, being represented by the dotted line 251, is measured by the temperature sensor 150 and provided as input data to the preconditioning model 118. Moreover, the actual temperature of the battery system 130 at the point in time of the shut-down, or disconnection, 260 of the battery system 130 may be used as input data to the preconditioning model 118. As shown in FIG. 3, the output data of the preconditioning model 118 is a temperature profile, represented by the dashed line 218, which is correlating well with the actual temperature 230 of the battery system 130. It should be noted that the actual temperature 230 of the battery system 130 is typically not measured, and is indicated here for illustrating purposes. The actual temperature 230 of the battery system 130 may be retrieved by requesting such data of the battery system 130. Stated differently, the known temperature characteristics of the battery system 130 may form the basis of the modelled temperature profile 218 as a function of time, ambient temperature, and initial temperature of the battery system 130 at the shut-down, or disconnection, 260 of the battery system 130 (and other input data and known heat transfer correlations known by the skilled person). Hereby, the current temperature of the battery system 130 may be estimated based on the temperature profile 218 of the preconditioning model 118.

Turning back to FIG. 2, the control unit 117 may according to at least one example embodiment, be configured to compare the estimated preconditioning status from the preconditioning model 118 with a reference value. Such reference value may be stored in the control unit 117. For example, the reference value may be based on historical data of the preconditioning model, or historical data of the vehicle component or system 130. Moreover, the control unit 117 may be configured to, in response of determining that the estimated preconditioning status differs from the reference value by a set threshold, retrieve the actual preconditioning status of the vehicle component or system 130 by activating the vehicle component or system 130. The set threshold may typically be based on the trustworthiness of the preconditioning model 118. For example, the set threshold may indicate that the preconditioning model 118 deviates from the reference value by a too high amount, and therefore, the estimated preconditioning status is not to be trusted.

The control unit 117 may request the actual preconditioning status of the vehicle component or system 130 by a first communication 131, and receive the actual preconditioning status of the vehicle component or system 130 in return to such request by a second communication 132, as indicated in FIG. 2. During such request, the vehicle component or system 130 is activated. By only activating the vehicle component or system 130 in case the estimated preconditioning status differs from the reference value by the set threshold, energy can be saved.

According to yet another example embodiment, the control unit 117 may be configured to activate heating and/or cooling of the vehicle component or system 130 in response of determining that the preconditioning status is outside of a predetermined range. The preconditioning status here is typically a temperature status, and the predetermined range is typically a temperature range in which the vehicle component or system 130 (e.g. battery system 130) is to be operated. That is, by determining the temperature status of the vehicle component or system 130, either by means of the estimated preconditioning status from the preconditioning model 118, or by the actual preconditioning status of the vehicle component or system 130, and comparing the temperature status with the temperature range, the control unit 117 activates heating and/or cooling of the vehicle component or system 130 in response to that the temperature status is outside of such temperature range. The heating or cooling is activated depending on which measure that brings the temperature status closer to the temperature range. The activation of such heating and/or cooling may be performed by means of a communication 131 between the control unit 117 and the vehicle component or system 130, or alternatively a heater or cooler coupled to the vehicle component or system 130.

Figure 4:
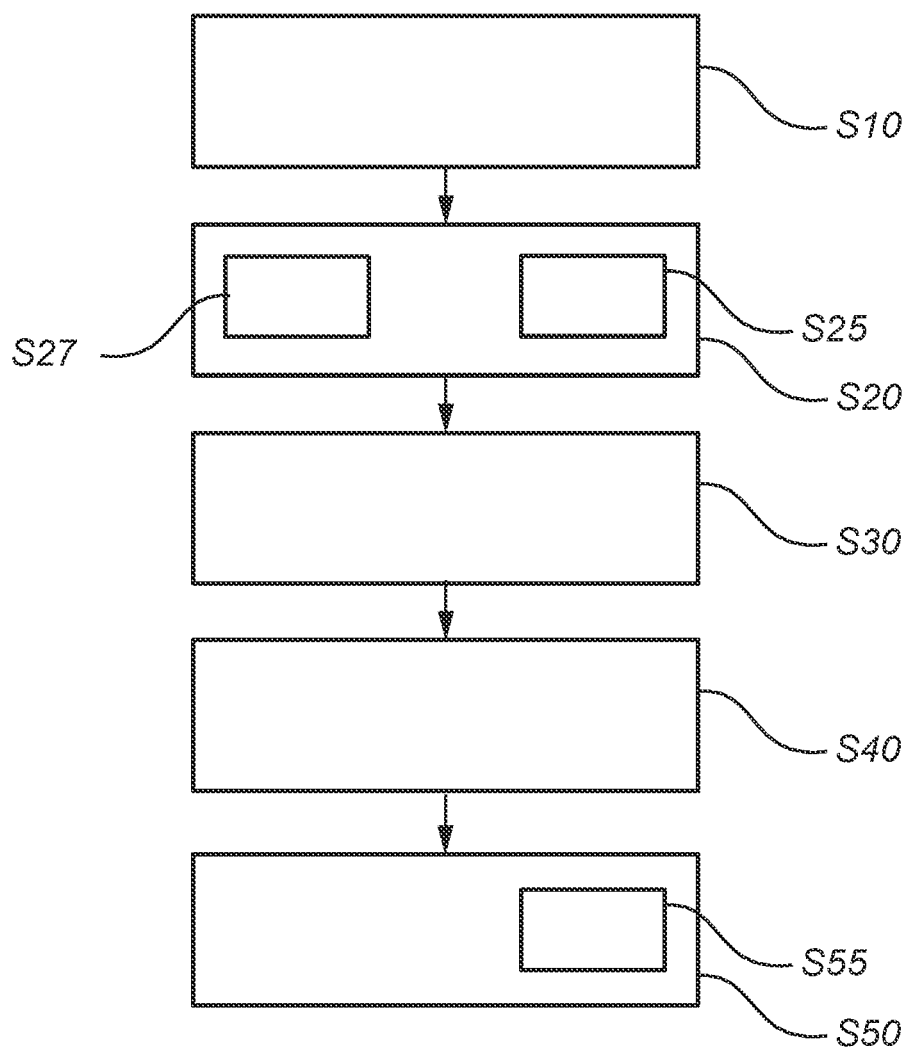
FIG. 4 is a flowchart illustrating the steps of a method in accordance with example embodiments of the invention.

A method of determining a preconditioning status of a vehicle component or system will now be described in more general terms with additional reference to FIG. 4. FIG. 4 is a flowchart describing the steps of such. The method may e.g. be implemented in the control unit 117 of FIG. 2, and used in the vehicle system 110 of FIG. 2 and vehicle 1 of FIG. 1.

In a first step S10, a preconditioning status request for a vehicle component or system is received. Such request is typically related to a particular vehicle component or system for which a preconditioning status request is conceivable.

In a second step S20, the preconditioning status is determined by a preconditioning model estimating the preconditioning status without activating the corresponding vehicle component or system. The preconditioning status may e.g. be a temperature status as previously described, and the preconditioning status request may thus comprise a request for the temperature of the vehicle component or system.

In a first sub-step S25 to the second step S20, the method comprises providing the preconditioning model, wherein the preconditioning model utilizes known temperature characteristics of the vehicle component or system to estimate the current temperature of the vehicle component or system. Such known temperature characteristics is typically based on a thermal model, or heat transfer model, of the vehicle component or system. The preconditioning model may further utilize input data, such as parameter data, to the preconditioning model. For example, input data as the ambient temperature of the vehicle may be used in the preconditioning model to estimate the current temperature of the vehicle component or system. Thus, the method may comprise a second sub-step S27 to the second step S20, of measuring the ambient temperature of the vehicle, and providing the ambient temperature as input data to the preconditioning model.

In a third step S30, the estimated preconditioning status is compared with a reference value, and in response of determining that the estimated preconditioning status differs from the reference value by a set threshold, in a fourth step S40, the actual preconditioning status of the vehicle component or system is retrieved by activating the vehicle component or system, respectively.

In a fifth step S50, the vehicle component or system is heated or cooled in response of determining that the preconditioning status is outside of a predetermined range. Thus, such fifth step S50 may comprises the sub-step S55 of comparing the preconditioning status with a predetermined range. For example, the preconditioning status is a temperature status, and the predetermined range is a temperature range.

Typically, the vehicle component or system is an energy storage system or fuel cell system of the vehicle, such as e.g. a battery system of the vehicle.

It should be noted that the naming of the steps not necessarily, but might according to at least one example embodiment, relate to the order in which the steps are carried out, unless explicitly stated otherwise. One or more of the steps may be combined and carried out simultaneously. The control unit 117 of FIG. 2 may be configured to carry out one or several of the steps S10-S50.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of determining a preconditioning status of a vehicle component or system, the method comprises:
   receiving a preconditioning status request for the vehicle component or system;
   determining the preconditioning status by a preconditioning model estimating the preconditioning status, wherein the preconditioning model estimates the preconditioning status without activating the vehicle component or system that is subject to the preconditioning status request, wherein the determining of the preconditioning status is not periodically cycled, and
   heating and/or cooling the vehicle component or system in response of determining that the preconditioning status is outside of a predetermined range.

2. The method according to claim 1, wherein the preconditioning status is a temperature status, and the preconditioning status request comprises a request for the temperature of the vehicle component or system.

3. The method according to claim 1, comprising providing the preconditioning model, wherein the preconditioning model utilizes known temperature characteristics of the vehicle component or system to estimate a current temperature of the vehicle component or system.

4. The method according to claim 1, wherein the preconditioning model utilizes an ambient temperature of the vehicle to estimate a current temperature of the vehicle component or system.

5. The method according to claim 4, further comprising measuring the ambient temperature of the vehicle, and providing the ambient temperature as input data to the preconditioning model.

6. The method according to claim 1, comprising comparing the estimated preconditioning status with a reference value, and in response of determining that the estimated preconditioning status differs from the reference value by a set threshold, retrieving the actual preconditioning status of the vehicle component or system by activating the vehicle component or system, respectively.

7. The method according to claim 1, wherein the vehicle component or system is an energy storage system or fuel cell system of the vehicle.

8. A non-transitory computer program comprising program code for performing the method according to claim 1, when the program code is run on a computer.

9. A control unit for determining a preconditioning status of a vehicle component or system, the control unit being configured to:
   receive a preconditioning status request for the vehicle component or system;
   determine the preconditioning status by using a preconditioning model to estimate the preconditioning status, wherein the preconditioning model estimates the preconditioning status without activating the vehicle component or system that is subject to the preconditioning status request, wherein the determine of the preconditioning status is not periodically cycled, and
   activate heating and/or cooling of the vehicle component or system in response of determining that the preconditioning status is outside of a predetermined range.

10. The control unit according to claim 9, wherein the control unit is configured to measure an ambient temperature of the vehicle, and to provide the ambient temperature as input data to the preconditioning model.

11. The control unit according to claim 9, configured to compare the estimated preconditioning status with a reference value, and in response of determining that the estimated preconditioning status differs from the reference value by a set threshold, retrieve the actual preconditioning status of the vehicle component or system by activating the vehicle component or system, respectively.

12. The control unit according to claim 9, wherein the control unit is a control unit for an energy storage system or a fuel cell system of the vehicle.

13. A vehicle comprising the control unit of claim 9.

* * * * *